United States Patent
Sato et al.

(10) Patent No.: US 6,312,758 B1
(45) Date of Patent: *Nov. 6, 2001

(54) COATING DEVICE AND COATING METHOD FOR HIGHSPEED COATING WITH AN ORGANIC SOLVENT

(75) Inventors: Shogo Sato; Osamu Maniwa, both of Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,666

(22) Filed: Apr. 9, 1998

(30) Foreign Application Priority Data

Apr. 11, 1997 (JP) .................................... 9-094215

(51) Int. Cl.$^7$ ................... B05D 1/26; B05C 3/18
(52) U.S. Cl. .................. 427/129; 427/131; 427/358; 118/410
(58) Field of Search .................. 427/129, 131, 427/358; 118/410

(56) References Cited

U.S. PATENT DOCUMENTS

| | | | |
|---|---|---|---|
| 4,424,762 | * | 1/1984 | Tanaka et al. ............... 118/410 |
| 4,681,062 | * | 7/1987 | Shibata et al. ............... 118/410 |
| 4,968,528 | * | 11/1990 | Tanaka et al. ............... 427/129 |
| 5,105,760 | * | 4/1992 | Takahashi et al. ............ 118/410 |
| 5,318,804 | * | 6/1994 | Yoshida ........................ 427/358 |
| 5,569,494 | * | 10/1996 | Suzuki et al. ................ 427/358 |
| 5,704,978 | * | 1/1998 | Maniwa ........................ 118/410 |

FOREIGN PATENT DOCUMENTS 2 734 500     11/1996    (FR) .

OTHER PUBLICATIONS

Webster's II New Riverside University Dictionary, The Riverside Publishing Company, p. 390, 1984.*

* cited by examiner

Primary Examiner—Katherine A. Bareford
(74) Attorney, Agent, or Firm—Bell, Boyd & Lloyd LLC

(57) ABSTRACT

Excellent coating device and method are disclosed which realize high-speed coating by improving the rigidity of a coating solution film and increasing the pressure of a coating solution film to a support so as not to be inferior to the wind pressure of an air film. In the coating method for extruding and applying an organic solvent contained in a paint used for a magnetic tape onto a continuously traveling support from a slit of an extrusion die, the slit spacing t1 is set to not greater than 50 μm and the gap t2 between the support and the extrusion die is set to 0.5 to 2 mm, while the extrusion speed of the organic solvent from the slit is set to not lower than 2.5 m/sec. A uniform film may be formed over a coating width only by the kinetic energy of the extruded solvent so as to enable realization of high coating film rigidity and coating solution pressure. Thus, high-speed coating onto the continuously traveling support may be carried out in a non-contact manner.

4 Claims, 2 Drawing Sheets

COATING DEVICE AND COATING METHOD FOR HIGHSPEED COATING WITH AN ORGANIC SOLVENT

BACKGROUND OF THE INVENTION

1. Field of the Invention

This invention relates to a coating device and a coating method using an extrusion die, and particularly to a coating device and a coating method which are effective for high-speed coating with an organic solvent.

2. Description of the Related Art

Curtain coating has been known as a method of coating a polyethylene terephthalate film or a paper support with a non-magnetic paint, a solvent or water in a non-contact manner.

This coating method is adapted for causing a coating solution extruded from a die to drop by its tare weight so as to form and apply a coating film onto a support. Therefore, the flowing speed of the coating solution is low, and as high-speed coating is to be carried out, the coating solution is broken by an air film accompanying the support which travels at a high speed, or the air enters a contact surface between the support and the coating solution, thus generating uneven coating and deterioration in coating quality. With respect to a magnetic tape in particular, since a polyethylene terephthalate or polyethylene naphthalate film having a mirror surface is used, the air film is likely to be generated and therefore high-speed coating is technically difficult.

The curtain coating method does not enable high-speed coating for the following reasons. That is, since the flowing speed of the coating solution is limited to a low speed by the gravity due to drop by its tare weight, the rigidity of the coating solution film is low. Also, the coating solution film cannot endure the wind pressure of the air film accompanying the flexible support traveling in the traverse direction of the coating film, or the air enters between the coating solution film and the support.

According to the known information, patented inventions are reported such that a preventive measure against the air film is taken by providing a reduced-pressure chamber at the entrance of a coating portion or such that a preparatory chamber is filled with a gas which is likely to be absorbed in the coating solution. However, no significant increase in speed can be expected and devices therefor are complicated and more difficult to operate.

SUMMARY OF THE INVENTION

In view of the foregoing status of the art, it is an object of the present invention to provide excellent coating device and method which realize high-speed coating by improving the rigidity of the coating solution film and increasing the pressure of the coating solution film to the support so as not to be inferior to the wind pressure of the air film.

As a result of intensive studies to achieve the above-described object, the present inventors have found that the rigidity of a coating solution film of a solvent may be improved to deal with an air film by increasing the kinetic energy of the solvent.

A coating device according to the present invention has been completed on the basis of such finding. In a coating device for extruding and applying an organic solvent onto a continuously traveling support from a slit of an extrusion die prior to preparation of a magnetic tape by coating the support with a paint, the slit spacing is not greater than 50 μm and the gap between the support and the extrusion die is 0.5 to 2 mm. The extrusion speed of the organic solvent from the slit is not lower than 2.5 m/sec.

In the coating device according to the present invention, the extrusion angle of the organic solvent is not smaller than 0° and smaller than 90° upward from the horizontal line.

Also, in a coating method according to the present invention for extruding and applying an organic solvent onto a continuously traveling support from a slit of an extrusion die prior to preparation of a magnetic tape by coating the support with a paint, the slit spacing is not greater than 50 μm and the gap between the support and the extrusion die is 0.5 to 2 mm. The extrusion speed of the organic solvent from the slit is not lower than 2.5 m/sec.

In the coating method according to the present invention, the extrusion angle of the organic solvent is not smaller than 0° and smaller than 90° upward from the horizontal line.

That is, in the coating device and the coating method according to the present invention, the organic solvent is extruded from the slit of the extrusion die at a high speed, thereby forming a uniform film over a coating width only by the kinetic energy of the extruded solvent so as to enable realization of high coating film rigidity and coating solution pressure. Thus, high-speed coating onto the continuously traveling support may be carried out in a non-contact manner.

DETAILED DESCRIPTION OF THE INVENTION

A preferred embodiment of an extrusion die coating device according to the present invention will now be described in detail with reference to the drawings.

Figure 1:
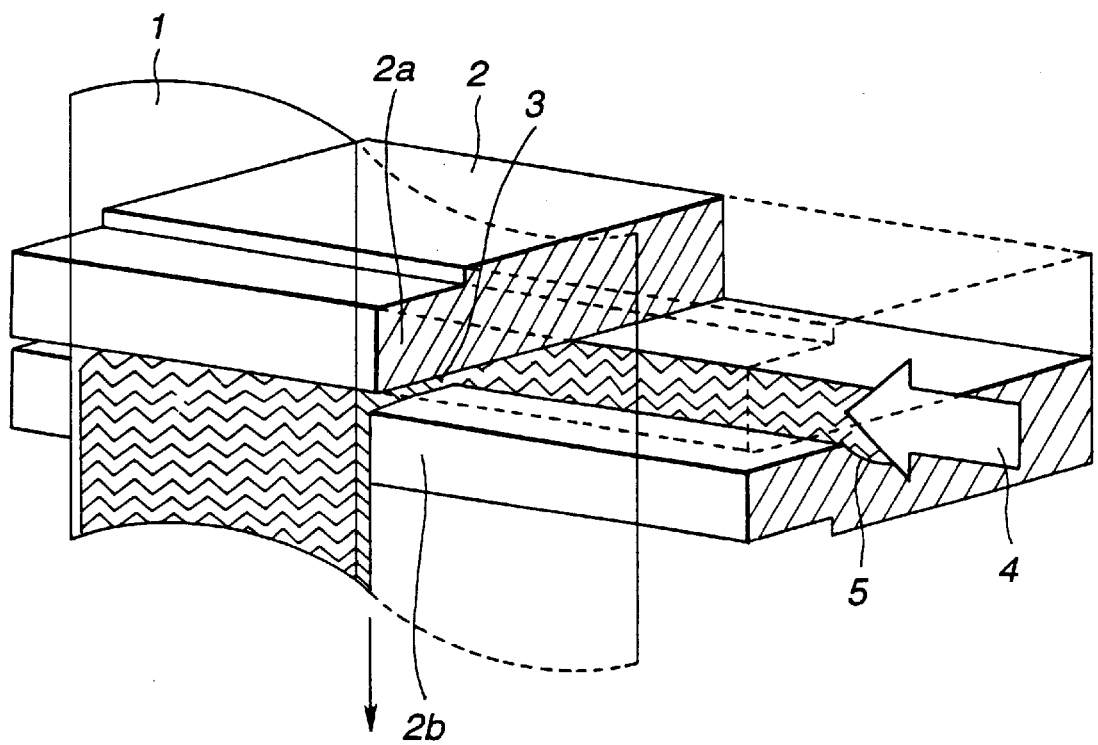
FIG. 1 is a conceptual view showing an exemplary structure of a coating device according to the present invention.

In the extrusion die coating device, as shown in FIG. 1, an extrusion die 2 made of a substantially rectangular-parallelepiped metal block having a predetermined width is provided at a halfway portion where a support 1 as a coating object is caused to sequentially travel downward from the upper side. The extrusion die 2 is provided on the lateral side of the support 1 which travels downward from the upper side in FIG. 1, and a pair of upper and lower lips 2a, 2b constituting the distal end surface of the extrusion die 2 face the surface of the support 1. A slit 3 corresponding to a coating width is formed between the front lip 2a and the back lip 2b. On the back side of the slit 3, a pocket 5 connected to the slit 3 is formed so that a coating solution, such as, an organic solvent 4 is stored in the pocket 5. The organic solvent 4 fed in the pocket 5 is supplied into the slit 3 and then extruded onto the surface of the support 1 which travels facing the pair of upper and lower lips 2a, 2b, so that a coating film is formed.

As the support, a flexible material is used, such as, a polyethylene terephthalate or polyethylene naphthalate film or paper.

Figure 2:
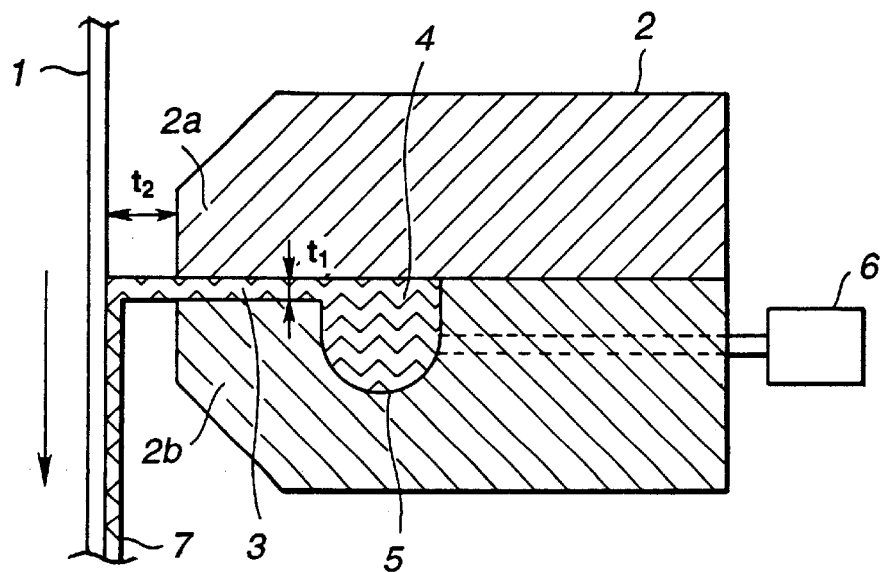
FIG. 2 is a cross-sectional view showing an exemplary structure of the coating device according to the present invention.

The extrusion die 2 is formed in a so-called wedge shape with its portion near the distal end surface being linearly and obliquely cut off, as shown in FIG. 2. Between the front lip 2a and the back lip 2b, the slit 3 corresponding to the coating width is formed. This slit 3 is a gap from which the organic solvent 4 is extruded. The extrusion die 2 is provided on the lateral side of the support 1 which travels downward from the upper side in FIG. 1, and the pair of upper and lower lips 2a, 2b constituting the distal end surface of the extrusion die 2 facing the surface of the support 1.

On the back side of the slit 3, the pocket 5 connected to the slit 3 is formed so that a coating solution can be stored therein. On both end portions of the pocket 5, an organic solvent support port, not shown, is provided and an organic solvent supply unit (precision metering pump) 6 for feeding the organic solvent 4 is connected thereto. The organic solvent supply unit 6 feeds the organic solvent 4 into the pocket 5 unidirectionally in a returnless manner under a predetermined pressure.

The organic solvent 4 fed under the pressure into the pocket 5 is supplied into the slit 3 and then extruded onto the surface of the support 1 which travels facing the pair of upper and lower lips 2a, 2b, so that a coating film 7 is formed.

At this point, the organic solvent 4 is extruded from the slit 3 at a high speed. Thus, a uniform film over the coating width is formed only by the kinetic energy of the extruded solvent, and high coating film rigidity and coating solution pressure may be obtained. Therefore, high-speed coating onto the continuously traveling support 1 may be carried out in a non-contact manner.

The basic structure of the coating device is described above. In this coating device, since the extrusion flow rate and the kinetic energy may be increased only by generating a large flow in the case where the slit spacing is large, it is preferred that the slit spacing is as narrow as possible. However, if the slit spacing is too narrow, particles in the organic solvent are likely to be caught in the slit. Therefore, the extruded film is broken and the pressure within the die is increased, making the device impractical.

If such conditions are set that coating may be carried out at the pressure resistance of a normal flexible pipe, that is, less than 10 kg/cm$^2$, a commercialized pipe or low-viscosity pump may be used. Therefore, an inexpensive and simple coating system may be constituted.

Thus, in the coating device and the coating method according to the present invention, the slit spacing t1 is not greater than 5.0 $\mu$m and the extrusion speed of the organic solvent from the slit is not lower than 2.5 m/sec.

Also, on the assumption that the extruded film is cantilevered, the bending moment by the wind pressure of the air film should be reduced. Therefore, it is preferred that the distance between the support and the die is as short as possible. However, if the distance is too short, the traveling support contacts the die and generates particles, causing coating defects (such as, stripes and particles left on the coating surface).

Thus, in the coating device and the coating method according to the present invention, the gap t2 between the support and the extrusion die is 0.5 to 2 mm.

In addition, when the solvent applied by the coating device of the present invention is used as a cleaning solution or pre-coating, instead of using the entire quantity of the solvent, the solvent may be processed with another solvent coated by another device, and exhausting a redundant solvent in the gravitational direction is effective in terms of designing of the device. Therefore, the die is not used as a fountain facing vertically upward.

By installing the die upward from the horizontal setting, the solvent may be prevented from flowing out of the die at the time of preparation for or stop of coating. Thus, stains on the flexible support, and unstable coating and entry of bubbles due to insufficient solvent filling in the die at the time re-coating, may be prevented.

Figure 3:
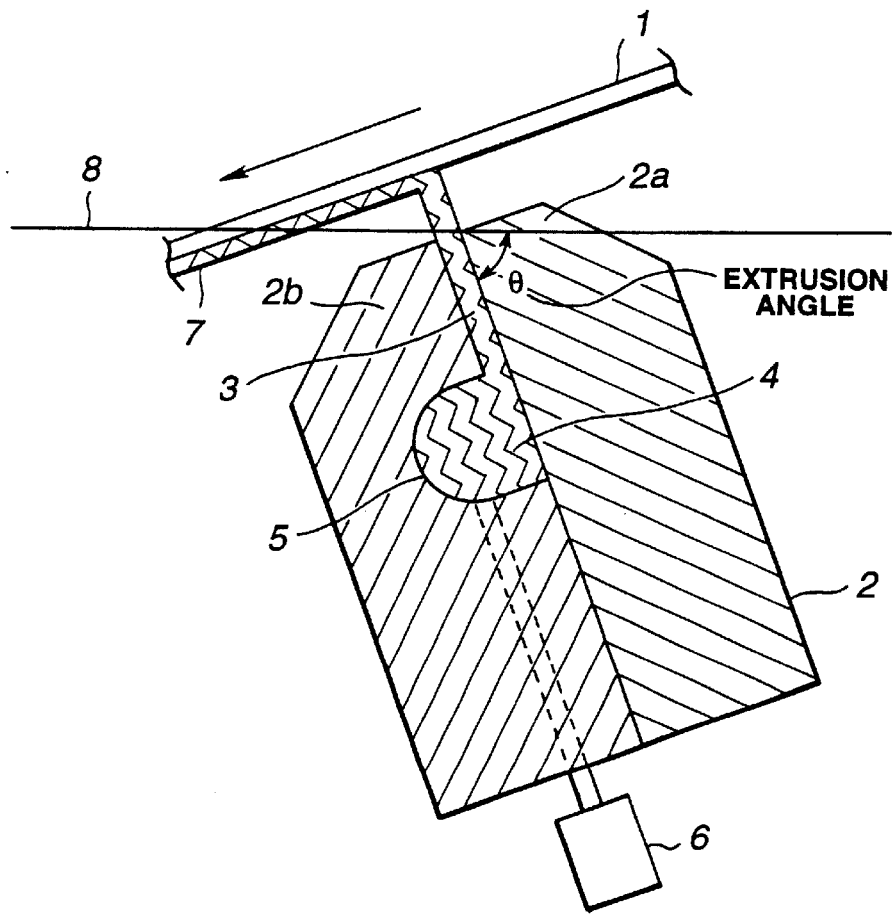
FIG. 3 is a cross-sectional view showing an exemplary structure of the coating device according to the present invention.

Thus, in the coating device and coating method according to the present invention, the extrusion angle θ of the organic solvent with respect to a horizontal line 8 is not smaller than 0° and smaller than 90° upward, as shown in FIG. 3.

Also, since the organic solvent harmful to human bodies may be generally handled without being exposed to the atmosphere until immediately before coating, the coating device and the coating method according to the present invention are excellent in safety and hygienical viewpoints.

EXAMPLE

Experiments of coating by using the coating device of the above-described structure will now be described.

In the experiments, a die made of stainless steel having a width of 160 mm was used, and the coating width was set to 100 mm.

Also, methylethyl ketone was used as the organic solvent, and a polyethylene terephthalate film for a magnetic film having a width of 125 mm and a thickness of 10 $\mu$m was used as the support.

Example 1

The slit spacing t1 was set to 10 $\mu$m, 30 $\mu$m, 50 $\mu$m and 100 $\mu$m, and the gap t2 between the support and the die was set to 0.2 mm, 0.5 mm, 1 mm, 2 mm and 3 mm for each of the above-mentioned spacings. Under such conditions, coating experiment was carried out at various coating speeds of 100 m/min, 200 m/min, 300 m/min, 400 m/min, 500 m/min, 600 m/min, 700 m/min, 800 m/min and 900 m/min. Table 1 shows the results.

TABLE 1

| Slit Spacing t1 ($\mu$m) Gap t2 Between Support and Die | | 10 | | | | | 30 | | | | |
|---|---|---|---|---|---|---|---|---|---|---|---|
| (mm) | | 0.2 | 0.5 | 1 | 2 | 3 | 0.2 | 0.5 | 1 | 2 | 3 |
| Coating Speed (m/min) | 100 | X | O | O | O | O | X | O | O | O | O |
| | 200 | X | O | O | O | O | X | O | O | O | O |
| | 300 | X | O | O | O | O | X | O | O | O | O |
| | 400 | X | O | O | O | O | X | O | O | O | X |
| | 500 | X | O | O | O | O | X | O | O | O | X |
| | 600 | X | O | O | O | X | X | O | O | O | X |
| | 700 | X | O | O | O | X | X | O | O | O | X |
| | 800 | X | O | O | O | X | X | O | O | O | X |
| | 900 | X | O | O | O | X | X | O | O | O | X |

| Slit Spacing t1 ($\mu$m) Gap t2 Between Support and Die | | 50 | | | | | 100 | | | | |
|---|---|---|---|---|---|---|---|---|---|---|---|
| (mm) | | 0.2 | 0.5 | 1 | 2 | 3 | 0.2 | 0.5 | 1 | 2 | 3 |
| Coating Speed (m/min) | 100 | X | O | O | O | O | X | O | O | O | X |
| | 200 | X | O | O | O | O | X | O | O | O | X |
| | 300 | X | O | O | O | X | X | O | O | O | X |
| | 400 | X | O | O | O | X | X | O | O | O | X |
| | 500 | X | O | O | O | X | X | X | X | X | X |
| | 600 | X | O | O | O | X | X | X | X | X | X |

TABLE 1-continued

| | | | | | | | | | | |
|---|---|---|---|---|---|---|---|---|---|---|
| 700 | X | ○ | ○ | ○ | X | X | X | X | X | X |
| 800 | X | ○ | ○ | ○ | X | X | X | X | X | X |
| 900 | X | ○ | ○ | ○ | X | X | X | X | X | X |

For evaluation of the coating experiment, the case where coating was carried out stably without causing any defect is denoted by ○, and the case where a defect was observed is denoted by x.

It is found that the support contacts the die if the gap between the support and die is 0.2 mm, and that the extruded film is likely to be affected by an air film if the gap is 3 mm. It is also found that the solvent extruded film is weak and likely to be affected by the air film if the slit spacing is 100 mm.

As is clear from Tables 1-1 and 1-2, under coating conditions such that the slit spacing is not greater than 50 μm and the distance between the support and the die is 0.5 to 2 mm, stable high-speed coating may be carried out even at 800 m/min.

Example 2

Coating experiment was carried out under the same conditions as in Example 1, that is, with the slit spacing t1, the gap t2 between the support and the die, and the coating speed changed to various values, except that the die is inclined from the horizontal position to have a mounting angle of 45° upward from the horizontal line, as shown in FIG. 3. The results were the same as those of Example 1. Therefore, it is found that stable high-speed coating may be similarly carried out even when the die is inclined upward.

Example 3

Coating experiments was carried out by setting the slit spacing t1 to 50 μm and the gap t2 between the flexible support and the die to 2 mm, and changing the solvent flowing speed to 1 m/sec, 1.5 m/sec, 2 m/sec, 2.5 m/sec, 3 m/sec and 3.5 m/sec. In this case, methylethyl ketone was used as the organic solvent, and the solvent flowing speed was calculated by dividing the solvent flow rate by the cross-sectional area of the slit. Table 2 shows the results.

TABLE 2

| Flowing Speed (m/sec) | Evaluation |
|---|---|
| 1 | x |
| 1.5 | x |
| 2 | x |
| 2.5 | ○ |
| 3 | ○ |
| 3.5 | ○ |

For evaluation, the case where an extruded film was formed in the gap between the support and the die is denoted by ○, and the case where an extruded film was not formed in the gap is denoted by x.

As is clear from Table 2, the solvent extruded film is not formed between the flexible support and the die if the solvent flowing speed is not higher than 2 m/sec. Thus, it is preferred that coating is carried out at a solvent flowing speed of not lower than 2.5 m/sec.

As is clear from the above description, according to the present invention, the organic solvent is extruded from the slit of the extrusion die at a high speed, thereby forming a uniform coating film over the coating width only by the kinetic energy of the extruded solution so as to enable realization of high coating film rigidity and coating solution pressure. Therefore, high-speed coating on the continuously traveling support may be carried out in a non-contact manner.

Thus, the present invention provides a stable coating system which has less coating defects and high productivity.

What is claimed is:

1. A coating method for extruding and applying an organic solvent from a slit of an extrusion die onto a continuous traveling support prior to preparation of a magnetic tape by coating the support with a paint, the method comprising the steps of:

moving the support downward relative to the die and horizontal, setting a spacing between walls of the slit to not greater than 50 μm, setting a gap between the support and the extrusion die to 0.5 mm, setting an extrusion speed of the organic solvent being positively coated from the slit onto the support to not lower than 2.5 m/sec, extruding the organic solvent through the slit and onto the traveling support without causing the organic solvent to contact a distal end surface of the extrusion die, said distal end surface having an upper and lower lip and facing the support wherein said slit is formed between said upper and lower lips, said upper and lower lips being equally spaced from said support, wherein said upper and lower lips form a flat surface in one plane which extends parallel to the support, and coating the solvent being coated on the support only by the kinetic energy of extruded solvent.

2. The coating method as claimed in claim 1, wherein the organic solvent is extruded at an extrusion angle not smaller than 0° and smaller than 90° upward from a horizontal line.

3. A coating device for extruding and applying an organic solvent onto a continuous traveling support from a slit of an extrusion die prior to preparation of a magnetic tape by coating the support with a paint, the support traveling downward relative to the die and horizontal, the solvent being coated on the support only by the kinetic energy of extruded solvent, the slit having a spacing between walls of the slit of not greater than 50 μm, the support and the extrusion die having a gap of 0.5 to 2 mm between each other, and the organic solvent being extruded from the slit at an extrusion speed of not lower than 2.5 m/sec, wherein the organic solvent is extruded during coating through the slit and onto the traveling support without contacting a distal end surface of the extrusion die, said distal end surface having an upper and lower lip and facing the support wherein said slit is formed between said upper and lower lip, said upper and lower lips being equally spaced from said support, wherein said upper and lower lips form a flat surface in one plane which extends parallel to the support.

4. The coating device as claimed in claim 3, wherein the organic solvent is extruded at an extrusion angle not smaller than 0° and smaller than 90° upward from a horizontal line.

* * * * *